US010545880B2

(12) United States Patent
Heo et al.

(10) Patent No.: US 10,545,880 B2
(45) Date of Patent: Jan. 28, 2020

(54) MEMORY DEVICE AND MEMORY SYSTEM PERFORMING AN UNMAPPED READ

(71) Applicant: SAMSUNG ELECTRONICS CO., LTD., Suwon-si, Gyeonggi-do (KR)

(72) Inventors: Young-Hoi Heo, Uijeongbu-si (KR); Sung-Won Jeong, Suwon-si (KR); Moon-Sang Kwon, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 219 days.

(21) Appl. No.: 15/624,009

(22) Filed: Jun. 15, 2017

(65) Prior Publication Data

US 2018/0137058 A1    May 17, 2018

(30) Foreign Application Priority Data

Nov. 16, 2016   (KR) .......... 10-2016-0152966

(51) Int. Cl.
*G06F 12/1081*   (2016.01)
*G06F 3/06*   (2006.01)
*G06F 13/16*   (2006.01)
*G06F 13/28*   (2006.01)

(52) U.S. Cl.
CPC .......... *G06F 12/1081* (2013.01); *G06F 3/061* (2013.01); *G06F 3/0659* (2013.01); *G06F 3/0679* (2013.01); *G06F 13/1673* (2013.01); *G06F 13/28* (2013.01); *G06F 2212/656* (2013.01)

(58) Field of Classification Search
CPC .. G06F 13/1673; G06F 12/1081; G06F 13/28; G06F 2212/656; G06F 3/061; G06F 3/0659; G06F 3/0679
See application file for complete search history.

(56) References Cited

U.S. PATENT DOCUMENTS

| | | | |
|---|---|---|---|
| 7,231,199 B2 * | 6/2007 | Adams | G06F 9/542 455/403 |
| 8,230,159 B2 | 7/2012 | Stenfort | |
| 8,898,417 B1 | 11/2014 | Post et al. | |
| 9,128,715 B2 | 9/2015 | Stenfort | |
| 9,189,383 B2 | 11/2015 | Im et al. | |
| 9,190,124 B2 | 11/2015 | Fanning et al. | |
| 10,157,012 B2 * | 12/2018 | Kelner | G06F 21/79 |
| 2008/0229325 A1 | 9/2008 | Supalov | |
| 2013/0103889 A1 | 4/2013 | Jeong | |
| 2013/0110410 A1 | 5/2013 | Hong et al. | |
| 2014/0143457 A1 | 5/2014 | Hart et al. | |
| 2014/0208062 A1 | 7/2014 | Cohen | |
| 2016/0092121 A1 | 3/2016 | Nazari et al. | |

* cited by examiner

*Primary Examiner* — Idriss N Alrobaye
*Assistant Examiner* — Richard B Franklin
(74) *Attorney, Agent, or Firm* — F. Chau & Associates, LLC

(57) ABSTRACT

A memory device includes an unmapped read control module and a page buffer. The unmapped read control module is configured to receive a read command from a host, determine whether the read command is an unmapped read command, and output a memset command when the read command is the unmapped read command. The page buffer is configured to generate unmapped data by performing a memset operation in response to the memset command. The memset operation does not include a read operation for a memory cell array.

18 Claims, 16 Drawing Sheets

FIG. 8

| Logical Address | Physical Address | Data |
|---|---|---|
| LAddr0 | PAddr0 | O |
| LAddr1 | PAddr1 | X |
| LAddr2 | PAddr2 | O |
| LAddr3 | PAddr3 | O |
| LAddr4 | PAddr4 | X |
| LAddr5 | PAddr5 | O |
| LAddr6 | PAddr6 | O |
| LAddr7 | PAddr7 | O |

FIG. 10

| Unmapped Data | Seed | Pattern |
|---|---|---|
| UMD1 | Sd1 | Pt1 |
| UMD2 | Sd1 | Pt2 |
| UMD3 | Sd2 | Pt1 |
| UMD4 | Sd2 | Pt2 |

MEMORY DEVICE AND MEMORY SYSTEM PERFORMING AN UNMAPPED READ

CROSS-REFERENCE TO RELATED APPLICATION

This application claims priority under 35 U.S.C. § 119 to Korean Patent Application No. 10-2016-0152966, filed on Nov. 16, 2016 in the Korean Intellectual Property Office, the disclosure of which is incorporated by reference herein in its entirety.

TECHNICAL FIELD

Exemplary embodiments of the inventive concept relate to a memory device and a memory system, and more particularly, to a memory device and a memory system performing an unmapped read operation.

DISCUSSION OF RELATED ART

A semiconductor memory device is a memory device implemented using semiconductors such as silicon (Si), germanium (Ge), gallium arsenide (GaAs), or indium phosphide (InP). Semiconductor memory device may be roughly categorized into volatile memory devices and nonvolatile memory devices.

A nonvolatile memory device is a memory device in which data stored therein does not disappear even if its power supply is interrupted. Examples of a nonvolatile memory device include read-only memory (ROM), programmable ROM (PROM), electrically programmable ROM (EPROM), electrically erasable programmable ROM (EEPROM), a flash memory device, phase-change random-access memory (PRAM), magnetic RAM (MRAM), resistive RAM (RRAM), or ferroelectric RAM (FRAM). The flash memory device may be a NOR type or a NAND type.

SUMMARY

According to an exemplary embodiment of the inventive concept, a memory device includes an unmapped read control module and a page buffer. The unmapped read control module is configured to receive a read command from a host, determine whether the read command is an unmapped read command, and output a memset command when the read command is the unmapped read command. The page buffer is configured to generate unmapped data by performing a memset operation in response to the memset command. The memset operation does not include a read operation for a memory cell array.

According to an exemplary embodiment of the inventive concept, a memory system includes a nonvolatile memory device and a volatile memory device. The nonvolatile memory device includes an unmapped read control module configured to receive a read command from a host, determine whether the read command is an unmapped read command, and output a memset command when the read command is the unmapped read command, and a page buffer configured to perform a memset operation corresponding to the memset command to generate unmapped data. The volatile memory device is communicably connected to the nonvolatile memory device and the host. The memset operation does not include a read operation for a nonvolatile memory cell array of the nonvolatile memory device.

According to an exemplary embodiment of the inventive concept, a method of operating a nonvolatile memory device includes receiving a read command from a host, determining whether the read command is an unmapped read command, performing an unmapped read operation to generate unmapped data when it is determined that the read command is the unmapped read command, and outputting the unmapped data to the host.

BRIEF DESCRIPTION OF THE DRAWINGS

The above and other features of the inventive concept will be more clearly understood by describing in detail exemplary embodiments thereof with reference to the accompanying drawings.

FIG. 8 is a mapping table according to an exemplary embodiment of the inventive concept.

FIG. 10 is an unmapped data table according to an exemplary embodiment of the inventive concept.

DETAILED DESCRIPTION OF THE EMBODIMENTS

Figure 1:
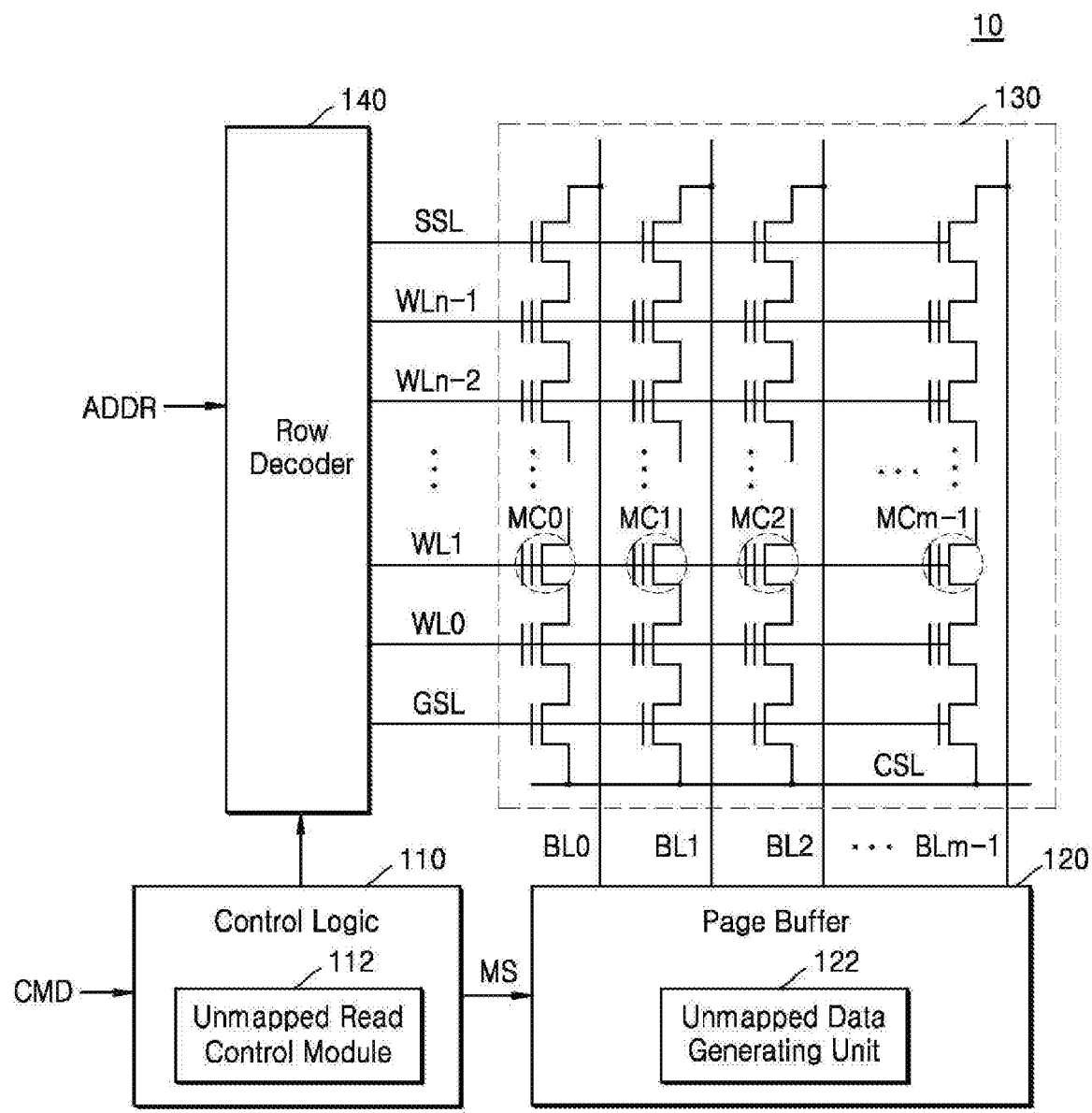
FIG. 1 is a block diagram of a nonvolatile memory device according to an exemplary embodiment of the inventive concept.

Exemplary embodiments of the inventive concept will be described more fully hereinafter with reference to the accompanying drawings. Like reference numerals may refer to like elements throughout this application.

Exemplary embodiments of the inventive concept provide a memory device and a memory system for determining an unmapped read command and generating unmapped data in a page buffer without performing a read operation for a memory cell array.

FIG. 1 is a block diagram of a nonvolatile memory device according to an exemplary embodiment of the inventive concept.

Referring to FIG. 1, a nonvolatile memory device 10 includes a control logic 110, a page buffer 120, a memory cell array 130, and a row decoder 140. Although the nonvolatile memory device 10 is shown as being a flash memory device, the inventive concept is not limited thereto, and may be applied to any type of nonvolatile memory device (e.g., read-only memory (ROM), programmable ROM (PROM), electrically programmable ROM (EPROM), electrically erasable programmable ROM (EEPROM), a flash memory device, phase-change random-access memory (PRAM), magnetic RAM (MRAM), resistive RAM (RRAM), ferroelectric RAM (FRAM), etc.).

The control logic 110 may output various control signals for controlling the page buffer 120 and the row decoder 140 to perform a read operation in response to a read command CMD. The read command CMD may include a normal read command and an unmapped read command. A normal read may refer to a read for an address where substantial data exists among addresses of the memory cell array 130. In other words, the normal read may refer to a read for data input to the nonvolatile memory device 10 by a user. The normal read command may be a command that a host outputs to perform the normal read. Meanwhile, an unmapped read may refer to a read for an address having no substantial data from among addresses of the memory cell array 130. In other words, the unmapped read may refer to a read for an address where data is not mapped. A host may output the unmapped read command, which performs the unmapped read according to a specific purpose and extracts unmapped data, to the nonvolatile memory device 10.

The control logic 110 may include an unmapped read control module 112. The unmapped read control module 112 may determine whether the read command CMD is the unmapped read command or the normal read command, and may output a memset command MS to the page buffer 120 when the read command CMD is the unmapped read command. Although FIG. 1 shows that the unmapped read control module 112 is included in the control logic 110, the inventive concept is not limited thereto. For example, the unmapped read control module 112 may be in a separate block or chip.

The page buffer 120 may operate as a write driver or as a sense amplifier depending on a mode of an operation. During a write operation, the page buffer 120 may transfer a bit line voltage, corresponding to data to be written, to a bit line of the memory cell array 130. During a read operation, the page buffer 120 may sense data stored in a selected memory cell of the memory cell array 130 through the bit line. The page buffer 120 may latch the sensed data and output the latched data to the outside. In addition, the page buffer 120 may include an unmapped data generating unit 122. The unmapped data generating unit 122 may receive the memset command MS from the unmapped read control module 112 and perform a memset operation, without a read operation for the memory cell array 130, to generate unmapped data. In other words, the memset operation may refer to an operation in which the page buffer 120 receives the memset command MS from the unmapped read control module 112 without performing a read operation for the memory cell array 130 to generate the unmapped data.

The memory cell array 130 may be connected to the row decoder 140 via word lines WLs, a string selecting line SSL, and a ground selecting line GSL. The word lines WLs may include word lines WL0 through WLn−1. The memory cell array 130 may also be connected to the page buffer 120 via bit lines BL0 through BLm−1. The memory cell array 130 may include a plurality of NAND cell strings connected to a common source line CSL. Each of the plurality of NAND cell strings may be connected to one of the bit lines BL0 through BLm−1 via a string selecting transistor SST. The memory cell array 130 may be formed of planes including a plurality of memory blocks, and the plurality of memory blocks may include a plurality of pages. The plurality of pages may include a plurality of memory cells MC. For example, the plurality of memory cells MC may include memory cells MC0 through MCm−1 connected to the word line WL1.

An exemplary embodiment of the inventive concept provides a three-dimensional (3D) memory array. The 3D memory array is monolithically formed on an active region disposed over a silicon substrate with at least one physical level of memory cell arrays having circuits formed on or in the silicon substrate and related to an operation of the memory cells. The term "monolithically" indicates that layers of each level forming the 3D memory array are stacked directly on layers of a respective lower level.

According to an exemplary embodiment of the inventive concept, the 3D memory array includes vertical NAND strings arranged in a vertical direction such that at least one memory cell is located above another memory cell. The at least one memory cell may include a charge trap layer.

U.S. Pat. Nos. 7,679,133, 8,553,466, 8,654,587, and 8,559,235, and U.S. Patent Application Publication No. 2011-0233648 are incorporated by reference herein in their entireties to describe suitable configurations for a 3D memory array including multiple levels and in which word lines and/or bit lines are shared between the levels. The memory cell array 130 will be described in detail below with reference to FIGS. 3 through 5.

The row decoder 140 may select any one of the memory blocks of the memory cell array 130 in response to an address ADDR. The row decoder 140 may select any one of the word lines WLs of the selected memory block. The row decoder 140 may transfer a word line voltage from a voltage generator to the selected word line of the selected memory block.

Figure 2:
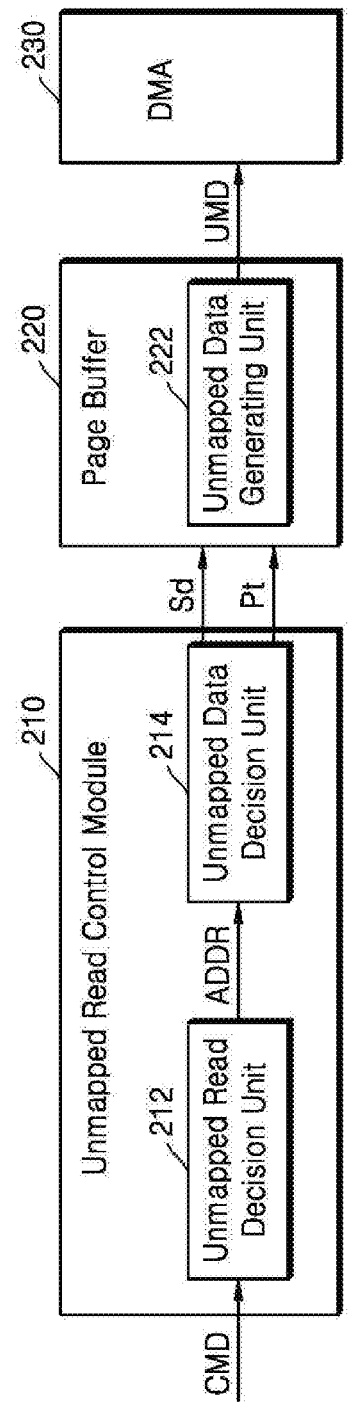
FIG. 2 is a block diagram of a part of a nonvolatile memory device according to an exemplary embodiment of the inventive concept.

FIG. 2 is a block diagram of a part of a nonvolatile memory device according to an exemplary embodiment of the inventive concept. In FIG. 2, like reference numerals to those in FIG. 1 denote like elements, and therefore, repeat descriptions thereof will be omitted.

Referring to FIGS. 1 and 2, the nonvolatile memory device 10 may include an unmapped read control module 210, a page buffer 220, and a direct memory access (DMA) 230. Furthermore, the unmapped read control module 210 may include an unmapped read decision unit 212 and an unmapped data decision unit 214. The page buffer 220 may include an unmapped data generating unit 222.

The unmapped read decision unit 212 may receive the read command CMD from a host. The read command CMD may include a target address ADDR for a memory cell to be a read target. The unmapped read decision unit 212 may determine whether the received read command CMD is an unmapped read command or a normal read command. According to an exemplary embodiment of the inventive concept, the unmapped read decision unit 212 may further receive a mapping table from another memory device or the memory cell array 130, and may determine whether the read command CMD is an unmapped read command by comparing the mapping table and the target address ADDR. Detailed descriptions thereof will be described below with reference to FIGS. 7 and 8.

If the received read command CMD is an unmapped read command, the unmapped read decision unit 212 may output the target address ADDR included in the read command CMD to the unmapped data decision unit 214. If the received read command CMD is not an unmapped read command but a normal read command, the unmapped read decision unit 212 may perform a normal memory read operation by outputting the normal read command to the page buffer 220 without outputting the target address ADDR to the unmapped data decision unit 214.

The unmapped data decision unit 214 may determine unmapped data based on the received target address ADDR and the like. The host may require unmapped data UMD with a particular data sequence. According to an exemplary embodiment of the inventive concept, the host may request in advance at least one kind of unmapped data UMD from the nonvolatile memory device 10. The unmapped data decision unit 214 may determine the kind of unmapped data UMD requested by the host. The unmapped data decision unit 214 may generate at least one of a seed Sd and a pattern Pt as the memset command MS by analyzing the unmapped data UMD. According to an exemplary embodiment of the inventive concept, the unmapped data decision unit 214 may receive an address matching table from another memory device or the memory cell array 130, and may compare the target address ADDR with the address matching table to determine the unmapped data UMD. The unmapped data decision unit 214 may further receive an unmapped data table from another memory device or the memory cell array 130 to compare the unmapped data UMD with the unmapped data table, and may generate the seed Sd and pattern Pt corresponding thereto. According to an exemplary embodiment of the inventive concept, the unmapped data decision unit 214 may generate the seed Sd and the pattern Pt using only the target address ADDR and the unmapped data table, without determining the unmapped data UMD. In this case, the unmapped data table may include information of the seed Sd and the pattern Pt according to an address. The unmapped data decision unit 214 may output the generated seed Sd and pattern Pt to the unmapped data generating unit 222 of the page buffer 220.

FIG. 2 shows that the unmapped read decision unit 212 outputs the target address ADDR to the unmapped data decision unit 214 to confirm the unmapped data UMD requested by the host, and the unmapped data decision unit 214 determines the unmapped data UMD using the target address ADDR. However, this is only an example, and the unmapped read decision unit 212 may output other information, by which unmapped data instead of the target address ADDR is confirmed, to the unmapped data decision unit 214. As another example, if the unmapped data UMD between the host and the nonvolatile memory device 10 is one type, the unmapped read decision unit 212 may output only a flag signal having data '1' to the unmapped data decision unit 214, and the unmapped data decision unit 214 may output the memset command MS based on the unmapped data UMD of one type in advance.

The unmapped data generating unit 222 may generate the unmapped data UMD based on the received seed Sd and the pattern Pt. The seed Sd may be a small unit of data, and the pattern Pt may be a specific algorithm that can be performed using the seed Sd. According to an exemplary embodiment of the inventive concept, the seed Sd may be one byte of data and the pattern Pt may be to copy the seed Sd up to a capacity of the page buffer 220. Detailed descriptions thereof will be described below with reference to FIGS. 9 through 12. The unmapped data generating unit 222 may output the generated unmapped data UMD to the DMA 230.

The DMA 230 may transfer data between the page buffer 220 and the host. For example, during a read operation, the DMA 230 may transmit data requested to be read from the nonvolatile memory device 10 to the host through a memory controller. In this case, the DMA 230 may transfer the data read from the nonvolatile memory device 10 to the memory controller and, at substantially the same time, may write information, to a meta area for sectors corresponding to the data, about a corresponding sector transferred to buffer memory.

Figure 3:
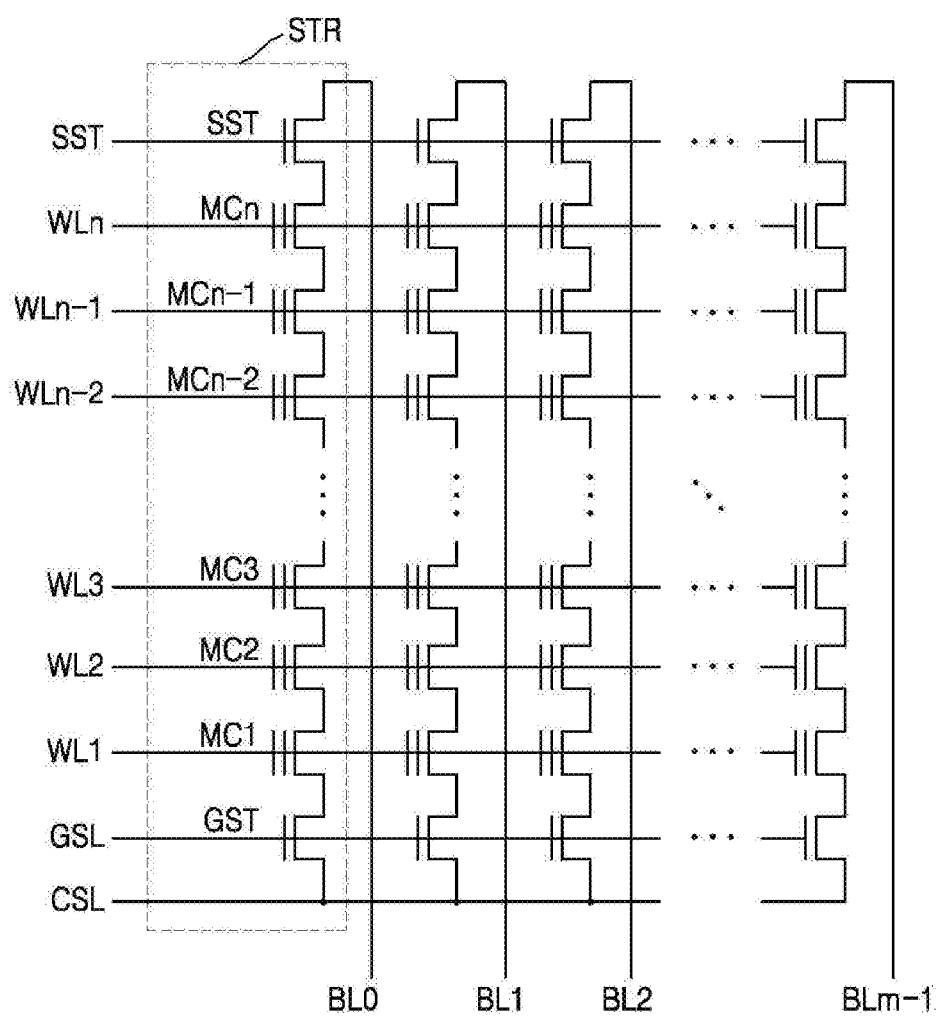
FIG. 3 is a circuit diagram of a memory block according to an exemplary embodiment of the inventive concept.

FIG. 3 is a circuit diagram of a memory block according to an exemplary embodiment of the inventive concept.

Referring to FIG. 3, for example, the memory cell array 130 of FIG. 1 may be a memory cell array of a horizontal NAND flash memory, and may include a plurality of memory blocks. Each memory block BLK0 may include n (where n is an integer greater than or equal to 2) strings STRs in which the plurality of memory cells MC are connected in series in a direction of the bit lines BL0 through BLm−1. Each of the strings STRs includes the string selecting transistor SST connected to a respective one of the bit lines BL0 through BLm−1 and a ground selecting transistor GST connected to a ground selecting line GSL. Each of the strings STRs is also connected to the common source line CSL. FIG. 3 shows an example in which each string STR includes eight memory cells (e.g., MC1 through MCn).

A NAND flash memory device having the structure as shown in FIG. 3 is erased on a block basis and executes a program in page units corresponding to each of the word lines WLs. FIG. 3 shows an example in which n pages for n word lines WL1 through WLn are provided in one block. In addition, the nonvolatile memory device 10 of FIG. 1 may include a plurality of memory cell arrays that perform substantially the same operation with substantially the same structure as the memory cell array 130 described above.

Figure 4:
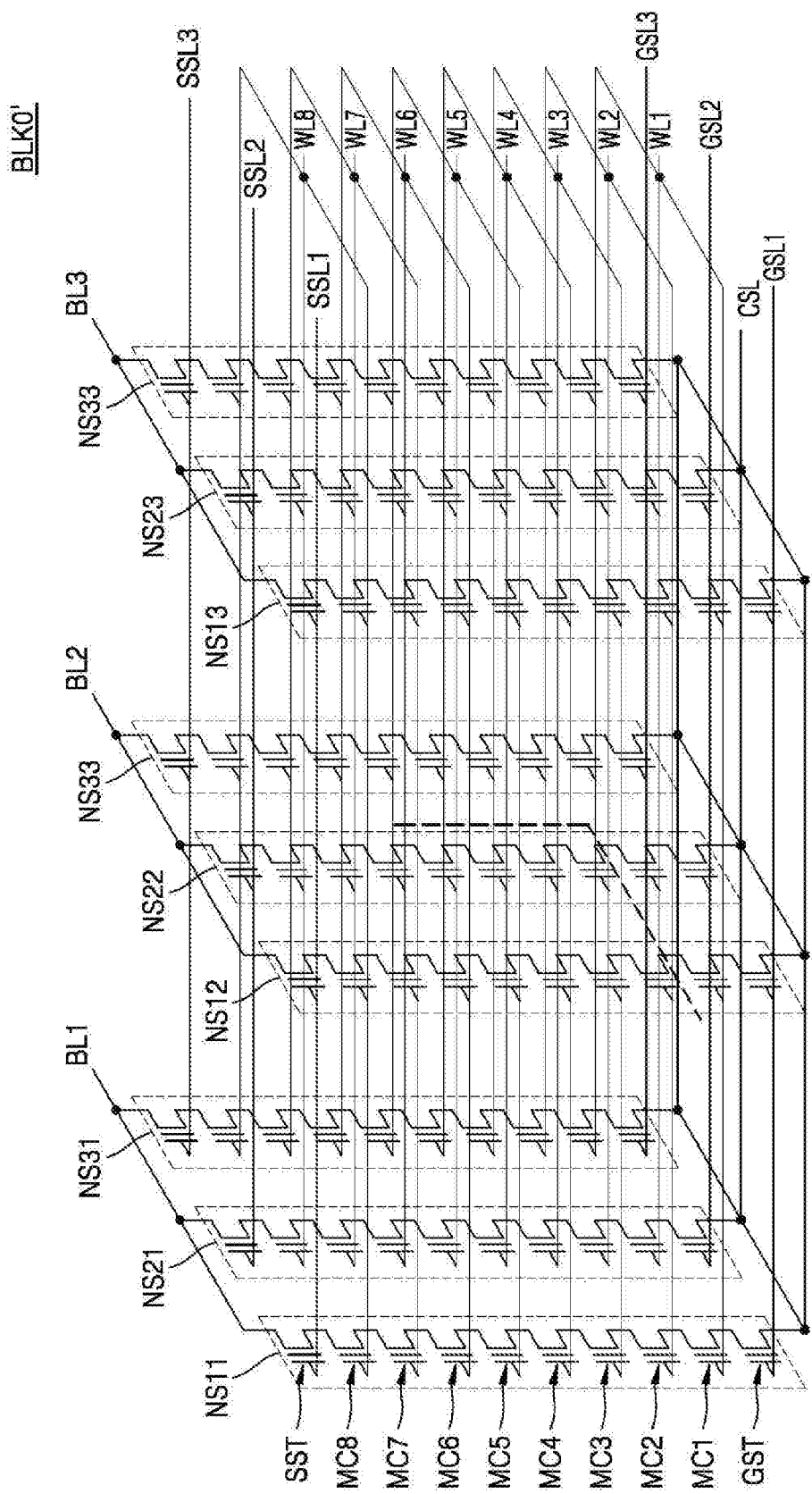
FIG. 4 is a circuit diagram of a memory block included in a memory cell array according to an exemplary embodiment of the inventive concept.

FIG. 4 is a circuit diagram of a memory block included in a memory cell array according to an exemplary embodiment of the inventive concept.

Referring to FIG. 4, for example, the memory cell array 130 of FIG. 1 may be a memory cell array of a vertical NAND flash memory, and may include a plurality of memory blocks. Each memory block BLK0' may include a plurality of NAND strings NS11 through NS33, a plurality of word lines WL1 through WL8, first through third bit lines BL1 through BL3, a plurality of ground selecting lines GSL1 through GSL3, a plurality of string selecting lines SSL1 through SSL3, and a common source line CSL. Here, the number of NAND strings, the number of word lines, the number of bit lines, the number of ground selecting lines, and the number of string selecting lines may be variously changed according to exemplary embodiments of the inventive concept.

The NAND strings NS11, NS21, and NS31 are provided between the first bit line BL1 and the common source line CSL, the NAND strings NS12, NS22, and NS32 are provided between the second bit line BL2 and the common source line CSL, and the NAND strings NS13, NS23, and NS33 are provided between the third bit line BL3 and the common source line CSL. Each NAND string (e.g., NS11) may include the string selecting transistor SST, a plurality of memory cells MC1 through MC8, and the ground selecting transistor GST that are connected in series.

NAND strings connected in common to one bit line form one column. For example, the NAND strings NS11, NS21, and NS31 connected in common to the first bit line BL1 may correspond to a first column, the NAND strings NS12, NS22, and NS32 connected in common to the second bit line BL2 may correspond to a second column, and the NAND strings NS13, NS23, and NS33 connected in common to the third bit line BL3 may correspond to a third column.

NAND strings connected to one string selecting line form one row. For example, the strings NAND NS11, NS12, and NS13 connected to the first string selecting line SSL1 may correspond to a first row, the NAND strings NS21, NS22, and NS23 connected to the second string selecting line SSL2 may correspond to a second row, and the NAND strings NS31, NS32, and NS33 connected to the third string selecting line SSL3 may correspond to a third row.

The string selecting transistor SST is connected to its corresponding string selecting line among the string selecting lines SSL1 through SSL3. The plurality of memory cells MC1 through MC8 are connected to the corresponding word lines WL1 to WL8, respectively. The ground selecting transistor GST is connected to its corresponding ground selecting line among the ground selecting lines GSL1 through GSL3. The string selecting transistor SST is also connected to its corresponding bit line among the bit lines BL1 through BL3, and the ground selecting transistor GST is also connected to the common source line CSL.

Word lines (e.g., WL1) having substantially the same height are commonly connected to one another. The string selecting lines SSL1 through SSL3 are separated from one another, and the ground selecting lines GSL1 through GSL3 are also separated from one another. For example, when memory cells connected to the first word line WL1 and belonging to the NAND strings NS11, NS12 and NS13 are programmed, the first word line WL1 and the first string selecting line SSL1 are selected. According to an exemplary embodiment of the inventive concept, the ground selecting lines GSL1 through GSL3 may be commonly connected to one another.

Figure 5:
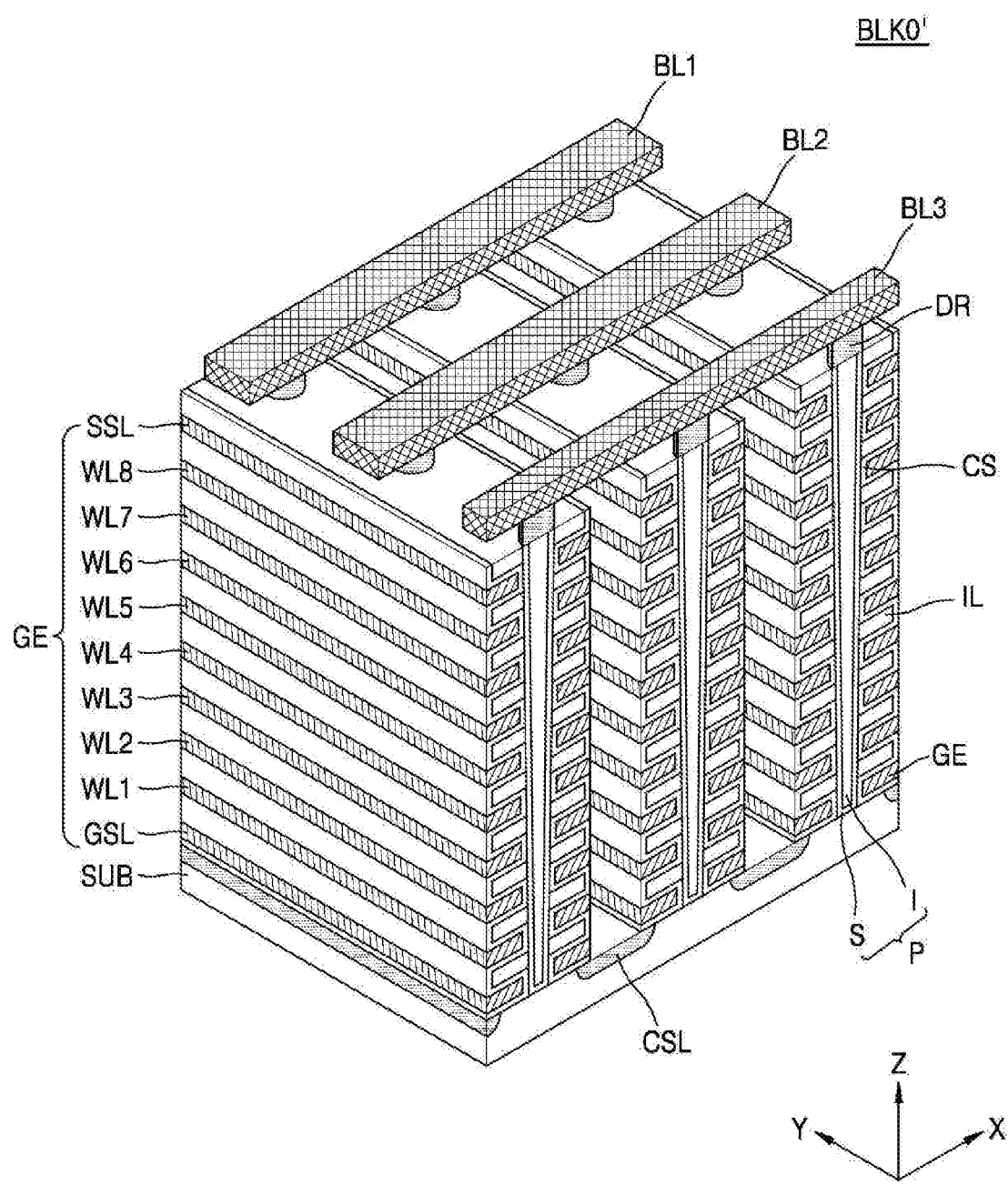
FIG. 5 is a perspective view of the memory block of FIG. 4 according to an exemplary embodiment of the inventive concept.

FIG. 5 is a perspective view of the memory block of FIG. 4 according to an exemplary embodiment of the inventive concept.

Figure 6:
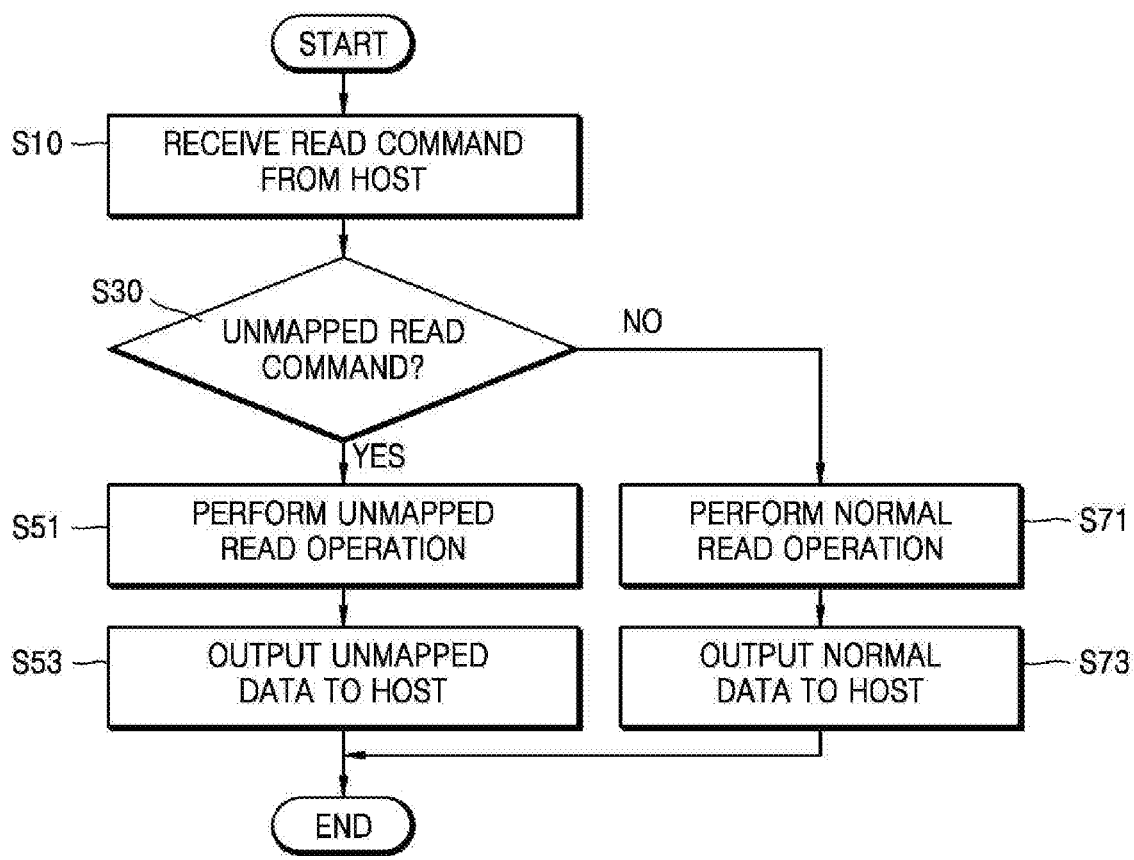
FIG. 6 is a flowchart illustrating an operation of a nonvolatile memory device according to an exemplary embodiment of the inventive concept.

Referring to FIG. 5, each memory block included in, e.g., the memory cell array 130 of FIG. 1, is formed in a direction perpendicular to a substrate SUB. Although FIG. 6 shows that a memory block includes two selecting lines GSL and SSL, eight word lines WL1 through WL8, and three bit lines BL1 through BL3, the numbers thereof may vary according to exemplary embodiments of the inventive concept.

The substrate SUB has a first conductivity type (e.g., p-type) and extends in a first direction (e.g., Y-direction), and the common source line CSL doped with impurities of a second conductivity type (e.g., n-type) is provided on the substrate SUB. A plurality of insulating layers IL extending along the first direction are sequentially provided along a second direction (e.g., Z-direction) on a region of the substrate SUB between two adjacent common source lines CSL, and the plurality of insulating layers IL are spaced apart from one another by a specific distance along the second direction. For example, the plurality of insulating layers IL may include an insulating material such as silicon oxide.

A plurality of pillars P arranged sequentially along the first direction and passing through the plurality of insulating layers IL along the second direction are provided on the region of the substrate SUB between the two adjacent common source lines CSL. For example, the plurality of pillars P may penetrate the plurality of insulating layers IL and contact with the substrate SUB. In more detail, a surface layer S of each pillar P may include a first type of silicon material and may function as a channel region. An inner layer I of each pillar P may include an insulating material such as silicon oxide or an air gap.

In the region of the substrate SUB between the two adjacent common source lines CSL, a charge storage layer CS is provided along exposed surfaces of the insulating layers IL, the pillars P, and the substrate SUB. The charge storage layer CS may include a gate insulating layer (referred to as a tunneling insulating layer), a charge trap layer, and a blocking insulating layer. For example, the charge storage layer CS may have an oxide-nitride-oxide (ONO) structure. In addition, in the region between the two adjacent common source lines CSL, a gate electrode GE such as the selecting lines GSL and SSL and the word lines WL1 through WL8 is formed on an exposed surface of the charge storage layer CS.

Drains or drain contacts DR are provided on the plurality of pillars P. For example, the drains or drain contacts DR may include a silicon material doped with impurities of the second conductivity type. On the drains DR are provided the bit lines BL1 through BL3 arranged in a third direction (e.g., X-direction) and spaced apart by a certain distance along the first direction.

FIG. 6 is a flowchart illustrating an operation of a nonvolatile memory device according to an exemplary embodiment of the inventive concept.

Referring to FIGS. 1 and 6, in operation S10, when the nonvolatile memory device 10 receives the read command CMD from the host, in operation S30, the unmapped read control module 112 may determine whether the received read command CMD is an unmapped read command. In operation S51, when the received read command CMD is an unmapped read command, an unmapped read operation is performed by the page buffer 120, and in operation S53, unmapped data generated as a result of performing the unmapped read operation may be output to the host. In operation S71, when the received read command CMD is not an unmapped read command, a normal read operation is performed where the memory cell array 130 is read by the page buffer 120, and in operation S73, normal data generated as a result of performing the normal read operation may be output to the host.

Figure 7:
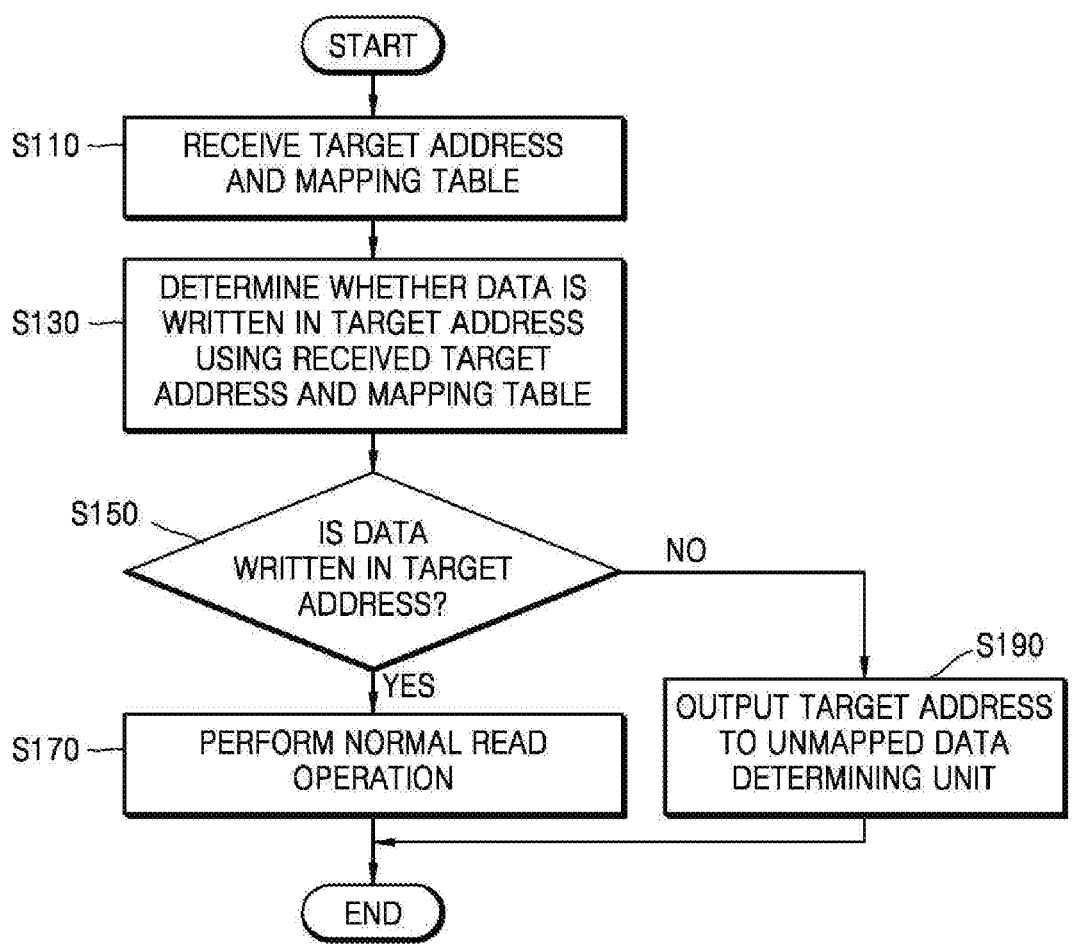
FIG. 7 is a flowchart illustrating an operation of an unmapped read decision unit according to an exemplary embodiment of the inventive concept.

FIG. 7 is a flowchart illustrating an operation of an unmapped read decision unit according to an exemplary embodiment of the inventive concept.

Referring to FIGS. 2 and 7, in operation S110, the unmapped read decision unit 212 may receive the read command CMD including the target address ADDR and the mapping table. The mapping table may be stored in a separate memory device or may be stored in, e.g., the nonvolatile memory device 10 of FIG. 1 according to exemplary embodiments of the inventive concept. In operation S130, the unmapped read decision unit 212 may determine whether data is written in the target address ADDR using the received target address ADDR and the mapping table. When data is written in the target address ADDR (operation S150: YES), in operation S170, the unmapped read decision unit 212 may output a normal read command to the page buffer 220 to perform a normal read operation. When data is not written in the target address ADDR (operation S150: NO), in operation S190, the unmapped read decision unit 212 may output the target address ADDR to the unmapped data decision unit 214 to perform an unmapped read operation.

FIG. 8 is a mapping table according to an exemplary embodiment of the inventive concept.

Referring to FIGS. 2 and 8, the unmapped read decision unit 212 may receive the mapping table to determine whether the read command CMD is an unmapped read command. The mapping table may include a mapping relationship between a logical address (e.g., first through eighth logical addresses LAddr0 through LAddr7) and a physical address (e.g., first through eighth physical addresses PAddr0 through PAddr7). Furthermore, the mapping table may further include whether or not data Data is written in the physical address. In the mapping table of FIG. 8, 'O' indicates that data is written, and 'X' indicates that data is not written.

According to an exemplary embodiment of the inventive concept, for example, when the read command CMD from the host is the read command CMD for the third logical address LAddr2, the unmapped read decision unit 212 may confirm information about the third physical address PAddr2 mapped to the third logic address LAddr2 through the mapping table and information that the data Data is written in the third physical address PAddr2. Therefore, the read command CMD for the third logic address LAddr2 may be a normal read command because data is written at the target address ADDR. In this example, the unmapped read decision unit 212 may output a normal read command to the page buffer 220 to perform a normal read operation according to the above determination.

As another example, when the read command CMD from the host is the read command CMD for the fifth logical address LAddr4, the unmapped read decision unit 212 may confirm information about the fifth physical address PAddr4 mapped to the fifth logical address LAddr4 through the mapping table and information that the data Data is not written in the fifth physical address PAddr4. Therefore, the read command CMD for the fifth logic address LAddr4 may be an unmapped read command because data is not written at the target address ADDR. In this example, the unmapped read decision unit 212 may output the target address ADDR to the unmapped data decision unit 214 to perform an unmapped read operation according to the above determination.

Figure 9:
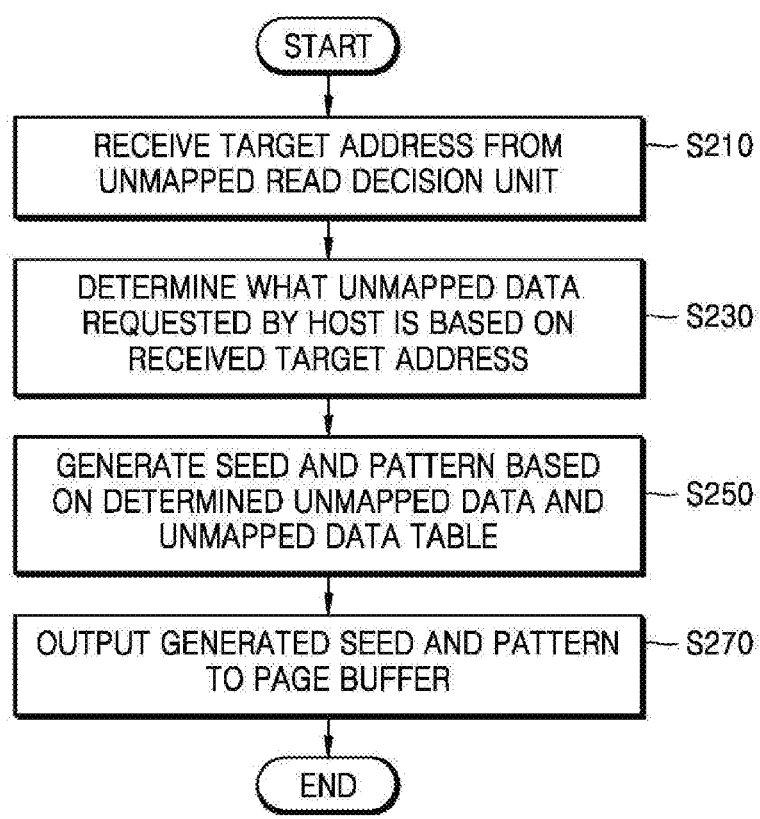
FIG. 9 is a flowchart illustrating an operation of an unmapped data decision unit according to an exemplary embodiment of the inventive concept.

FIG. 9 is a flowchart illustrating an operation of an unmapped data decision unit according to an exemplary embodiment of the inventive concept.

Referring to FIGS. 2 and 9, in operation S210, the unmapped data decision unit 214 may receive the target address ADDR from the unmapped read decision unit 212. In operation S230, the unmapped data decision unit 214 may determine what the unmapped data UMD requested by the host is based on the received target address ADDR. According to an exemplary embodiment of the inventive concept, the unmapped data decision unit 214 may receive an address matching table including matching information about the target address ADDR and the unmapped data UMD, and may determine what the unmapped data UMD requested by the host is by using the address matching table.

In operation S250, the unmapped data decision unit 214 may further receive an unmapped data table and may generate the corresponding seed Sd and pattern Pt based on the determined unmapped data UMD and the unmapped data table. According to an exemplary embodiment of the inventive concept, the unmapped data table may include a matching relationship among the unmapped data UMD, the seed Sd, and the pattern Pt. According to an exemplary embodiment of the inventive concept, the unmapped data table may include matching information between the target address ADDR and the seed Sd and pattern Pt. In operation S270, the unmapped data decision unit 214 may output the generated seed Sd and pattern Pt to the page buffer 220. According to an exemplary embodiment of the inventive concept, the unmapped data decision unit 214 may output only the seed Sd to the page buffer 220.

FIG. 10 is an unmapped data table according to an exemplary embodiment of the inventive concept.

Referring to FIGS. 2, 9, and 10, the unmapped data table may include matching information among first through fourth unmapped data UMD1 through UMD4, first and second seeds Sd1 and Sd2, and first and second patterns Pt1 and Pt2. The seeds and patterns may include information for generating the unmapped data. As a result of analyzing the target address ADDR received from the unmapped read decision unit 212 according to an exemplary embodiment of the inventive concept, the unmapped data decision unit 214 may determine that the unmapped data requested by the host is the third unmapped data UMD3. According to an exemplary embodiment of the inventive concept, the unmapped data decision unit 214 may receive the address matching table from, e.g., the memory cell array 130 of the nonvolatile memory device 10 of FIG. 1 or a separate memory device. When the unmapped data UMD corresponding to the target address ADDR in the received address matching table is the third unmapped data UMD3, the unmapped data decision unit 214 may determine that the third unmapped data UMD3 is the unmapped data requested by the host. The unmapped data decision unit 214 may receive the unmapped data table to generate the second seed Sd2 and the first pattern Pt1 that match the third unmapped data UMD3. The unmapped data decision unit 214 may output the generated second seed Sd2 and first pattern Pt1 to the page buffer 220.

Figure 11:
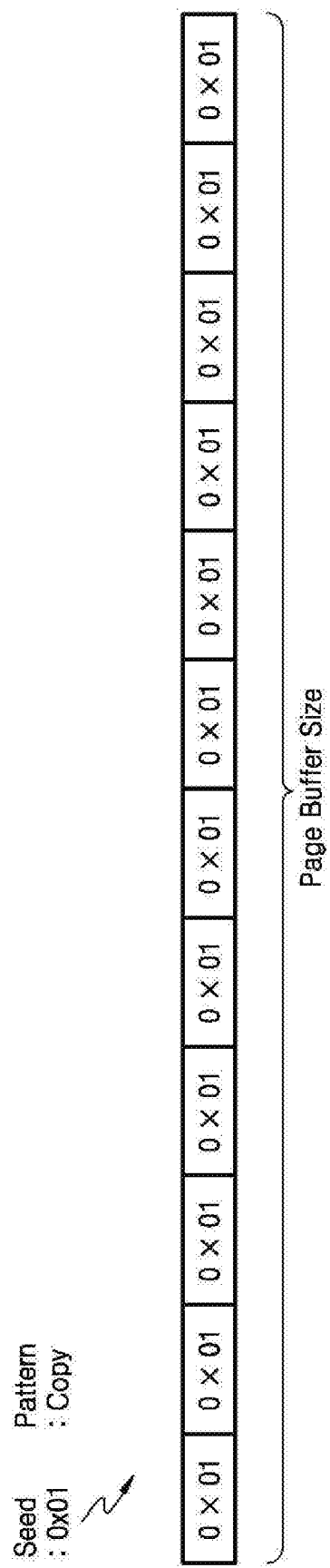
FIGS. 11 and 12 are views of unmapped data according to exemplary embodiments of the inventive concept.
Figure 12:
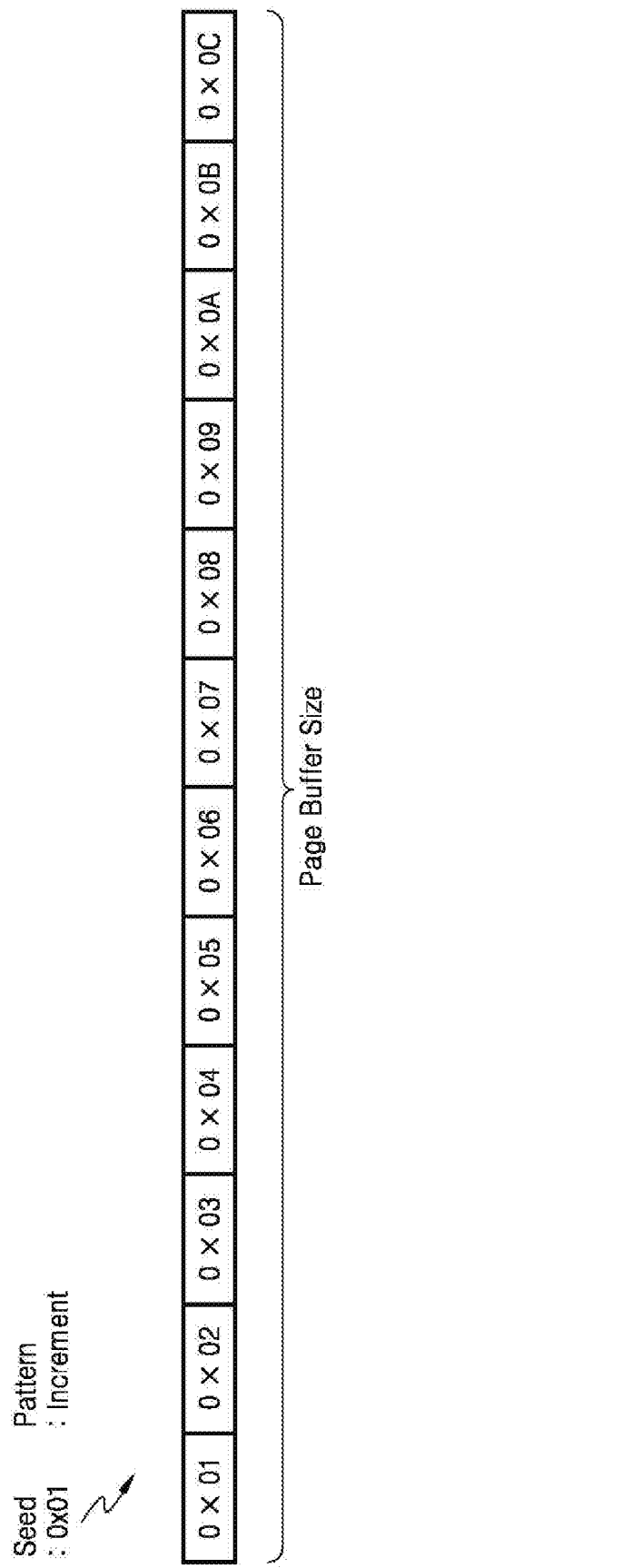

FIGS. 11 and 12 are views of unmapped data according to exemplary embodiments of the inventive concept.

Referring to FIGS. 2, 11, and 12, the unmapped data generating unit 222 may receive the seed Sd and the pattern Pt from the unmapped data decision unit 214. The seed Sd may be a small unit of data, and the pattern Pt may be a certain algorithm that can be performed using the seed Sd. The unmapped data generating unit 222 may automatically generate the unmapped data UMD having the capacity of the page buffer 220 by receiving the seed Sd and the pattern Pt without reading the memory cell array 130 of FIG. 1. Accordingly, since the read time for the memory cell array 130 is reduced, the nonvolatile memory device 10 according to exemplary embodiments of the inventive concept may perform an unmapped read operation more quickly.

When the seed Sd is 0x01 and the pattern Pt is "copy," as shown in FIG. 11, the unmapped data generating unit 222 may copy 0x01 up to the capacity of the page buffer 220 and generate the unmapped data UMD in which 0x01 is repeated. Furthermore, when the seed Sd is 0x01 and the pattern Pt is "increment," as shown in FIG. 12, the unmapped data generating unit 222 may generate the unmapped data UMD by increasing 0x01 by 1 up to the capacity of the page buffer 220.

FIGS. 11 and 12 show only examples in which the seed Sd is 0x01 and the pattern Pt is "copy" or "increment." However, the inventive concept is not limited thereto. The seed Sd and the pattern Pt may vary so long as the seed Sd is a small unit of data necessary for automatically generating the unmapped data UMD required by the host and the pattern Pt is a specific algorithm.

Figure 13:
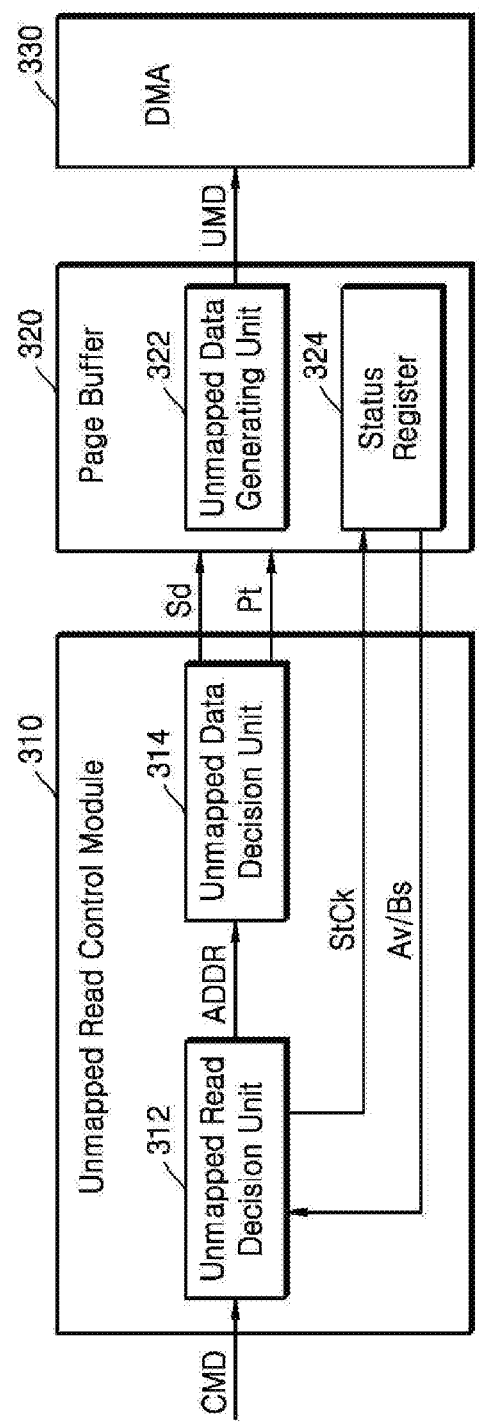
FIG. 13 is a block diagram of a part of a nonvolatile memory device according to an exemplary embodiment of the inventive concept.

FIG. 13 is a block diagram of a part of a nonvolatile memory device according to an exemplary embodiment of the inventive concept. In FIG. 13, like reference numerals to those in FIG. 2 denote like elements, and therefore, repeat descriptions thereof will be omitted.

Referring to FIGS. 2 and 13, the nonvolatile memory device may include an unmapped read control module 310, a page buffer 320, and a DMA 330. The unmapped read control module 310 includes an unmapped read decision unit 312 and an unmapped data decision unit 314. The page buffer 320 includes an unmapped data generating unit 322. The nonvolatile memory device of FIG. 13 may further include a status register 324 in the page buffer 320 unlike the nonvolatile memory device 10 of FIG. 1, while other characteristics may be substantially the same as the nonvolatile memory device 10. Therefore, only differences in operation due to an addition of the status register 324 will be described below with reference to FIG. 13.

The unmapped read decision unit 312 may receive the read command CMD and output a status check signal StCk to the status register 324. The status register 324 may include information about an operation status of the page buffer 320. Therefore, the status register 324 may output a busy signal Bs or an available signal Av indicating a status of the page buffer 320 to the unmapped read decision unit 312 in response to the status check signal StCk. For example, the status register 324 may output the busy signal Bs to the unmapped read decision unit 312 when the page buffer 320 is performing a specific operation according to another command, and may output the available signal Av to the unmapped read decision unit 312 when the page buffer 320 is not performing a specific operation according to another command.

The unmapped read decision unit 312 may perform an unmapped read operation or a normal read operation only when the available signal Av is received from the status register 324. When receiving the busy signal Bs from the status register 324, the unmapped read decision unit 312 may not perform the unmapped read operation or the normal read operation, and the unmapped read operation or the normal read operation may be performed after the available signal Av is received.

Figure 14:
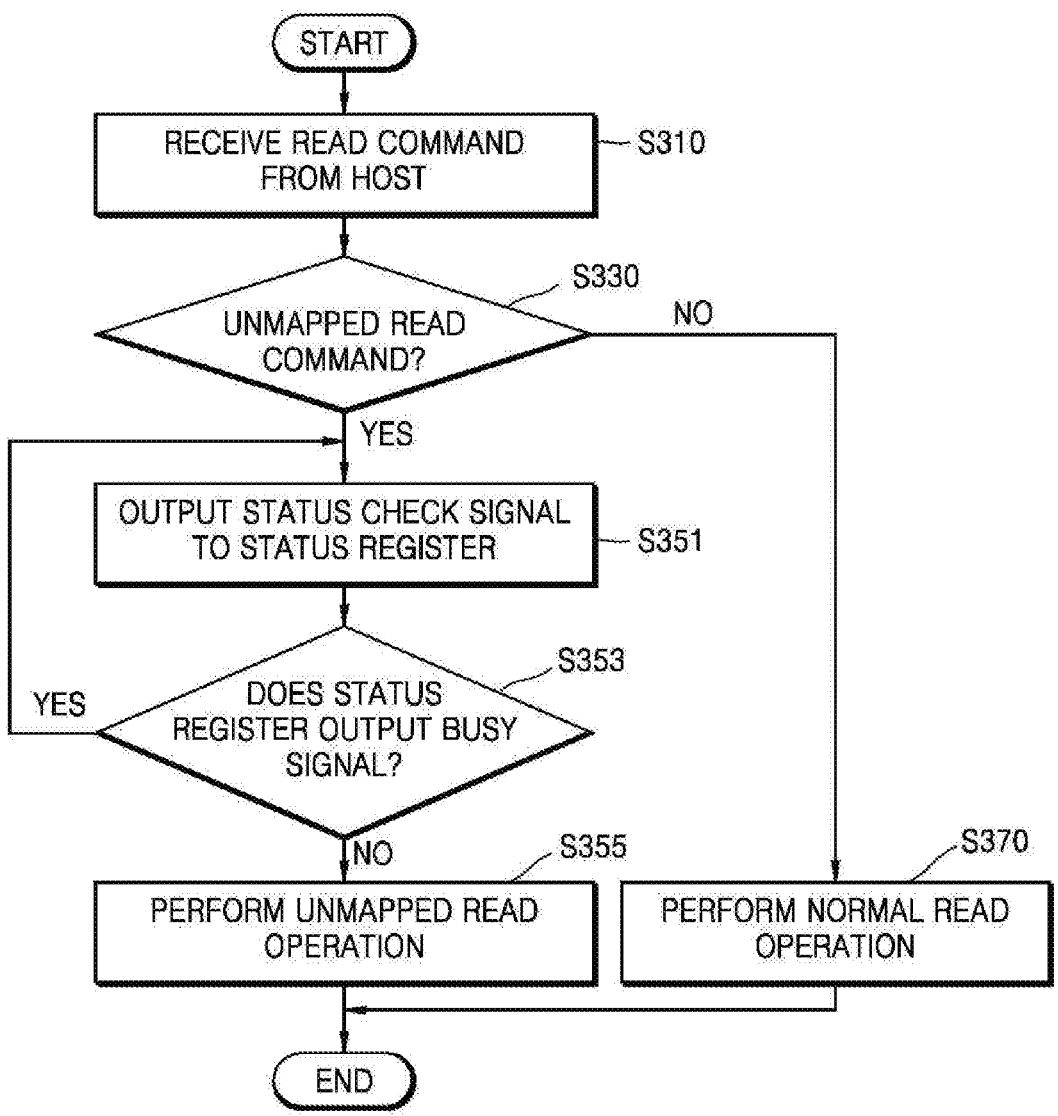
FIG. 14 is a flowchart illustrating an operation of an unmapped read control module and a page buffer according to an exemplary embodiment of the inventive concept.

FIG. 14 is a flowchart illustrating an operation of an unmapped read control module and a page buffer according to an exemplary embodiment of the inventive concept.

Referring to FIGS. 13 and 14, in operation S310, the unmapped read decision unit 312 may receive the read command CMD from a host. In operation S330, the unmapped read decision unit 312 may determine whether the received read command CMD is an unmapped read command. If the received read command CMD is an unmapped read command (operation S330: YES), in operation S351, the unmapped read decision unit 312 may output the status check signal StCk to the status register 324. In operation S353, the status register 324 may confirm the status of the page buffer 320 and output the busy signal Bs or the available signal Av to the unmapped read decision unit 312.

When the unmapped read decision unit 312 receives the busy signal Bs from the status register 324 (operation S353: YES), the unmapped read decision unit 312 may output the status check signal StCk to the status register 324 again after a predetermined time has elapsed (operation S351). When the unmapped read decision unit 312 receives the available signal Av from the status register 324 (operation S353: NO), in operation S355, the unmapped read decision unit 312 may output the target address ADDR to the unmapped data decision unit 314 to perform an unmapped read operation.

When the unmapped read decision unit 312 determines that the read command CMD is not an unmapped read command (operation S330: NO), in operation S370, the unmapped read decision unit 312 may output a normal read command to the page buffer 220 to perform a normal read operation.

Figure 15:
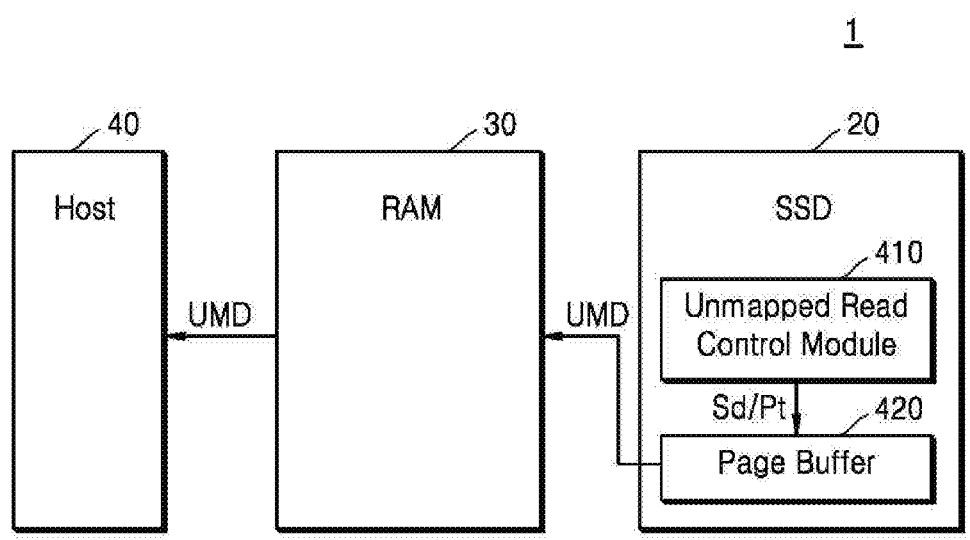
FIG. 15 is a block diagram of a memory system according to an exemplary embodiment of the inventive concept.

FIG. 15 is a block diagram of a memory system according to an exemplary embodiment of the inventive concept.

Referring to FIGS. 1 and 15, a memory system 1 may include a nonvolatile memory device 20, a volatile memory device 30, and a host 40. The memory system 1 may further include a controller capable of controlling the nonvolatile memory device 20 and the volatile memory device 30. The nonvolatile memory device 20 may be the same as or similar to the nonvolatile memory device (e.g., the nonvolatile memory device 10) described with reference to FIGS. 1 through 14.

The nonvolatile memory device 20 may include an unmapped read control module 410 and a page buffer 420. The unmapped read control module 410 may output at least one of the seed Sd and the pattern Pt as a memset signal to the page buffer 420 in response to the read command CMD, and the page buffer 420 may perform a memset operation corresponding thereto. The page buffer 420 may output the unmapped data UMD, generated as a result of performing the memset operation, to the volatile memory device 30. As described above, the nonvolatile memory device 20 may further include a DMA, and the page buffer 420 may output the unmapped data UMD to the volatile memory device 30 through the DMA.

The nonvolatile memory device 20 is shown as a solid state drive or a solid state disk (SSD), but the inventive concept is not limited thereto. For example, the nonvolatile memory device 20 may include EEPROM, a flash memory, PRAM, RRAM, nano floating gate memory (NFGM), polymer RAM (PoRAM), MRAM, or FRAM, or may include a magnetic disk or the like.

The volatile memory device 30 may output the received unmapped data UMD to the host 40. Since the volatile memory device 30 may have a faster data input/output speed than the nonvolatile memory device 20, the transmission of the unmapped data UMD using the volatile memory device 30 may be more efficient than the transmission of the unmapped data UMD using the nonvolatile memory device 20.

Although the volatile memory device 30 is shown as RAM, the volatile memory device 30 is not limited to static random access memory (SRAM) or dynamic random access memory (DRAM) and may also include a latch, a flip-flop, or a register.

Figure 16:
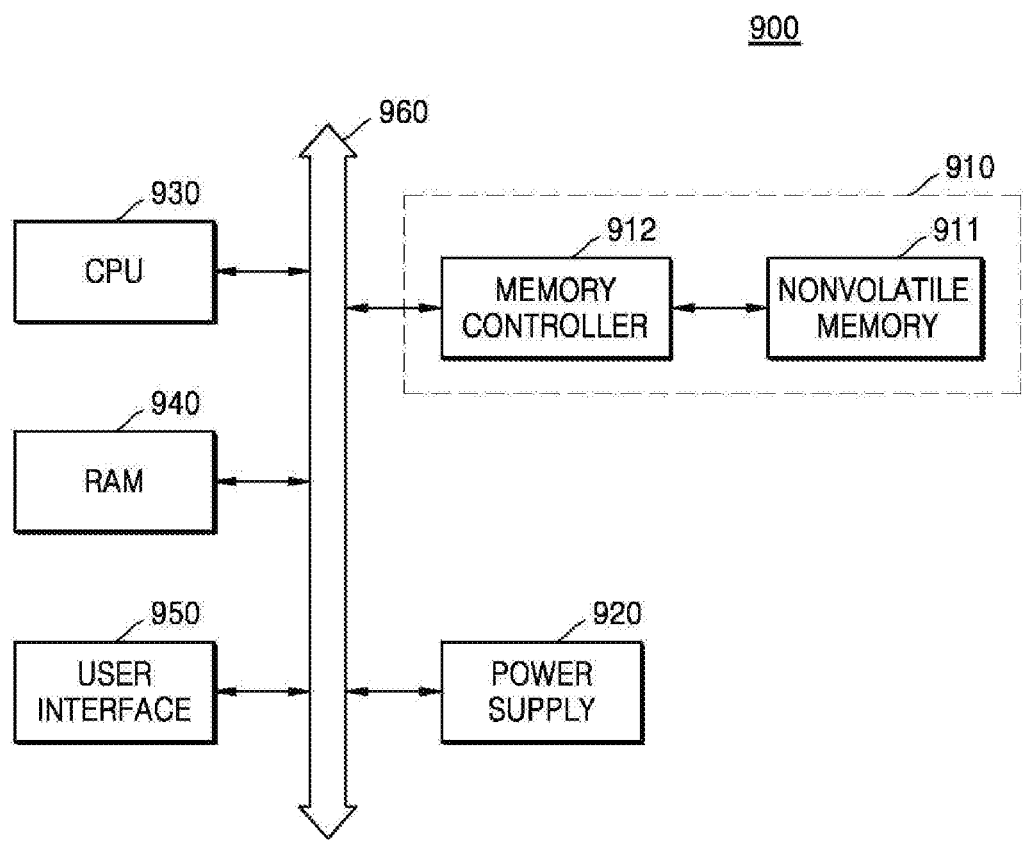
FIG. 16 is a block diagram of a computing system device including a nonvolatile memory device according to an exemplary embodiment of the inventive concept.

FIG. 16 is a block diagram of a computing system device including a nonvolatile memory device according to an exemplary embodiment of the inventive concept.

Referring to FIG. 16, a computing system device 900 may include a microprocessor 930, a user interface 950, and a nonvolatile memory system 910 having a memory controller 912 and a nonvolatile memory device 911. The nonvolatile memory device 911 may store N-bit data processed/to be processed by the microprocessor 930 (where N is an integer greater than or equal to 1) through the memory controller 912. In addition, the nonvolatile memory device 911 may also include the nonvolatile memory device as described with reference to FIGS. 1 through 14. The computing system device 900 may further include RAM 940 and a power supply 920. Components of the computing system device 900 may all be electrically connected to a bus 960.

If the computing system device 900 is a mobile device, a battery for supplying an operating voltage of a computing system and a modem such as a baseband chipset may be additionally provided. Furthermore, it is to be understood by those of ordinary skill in the art that the computing system device 900 may also be provided with an application chipset, a camera image processor (CIS), mobile DRAM, and the like, and therefore, detailed descriptions thereof will not be given herein.

The memory controller 912 and the nonvolatile memory device 911 may constitute, e.g., an SSD using a nonvolatile memory for storing data.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

What is claimed is:

1. A memory device comprising:
an unmapped read control module configured to receive a read command from a host, determine whether the read command is an unmapped read command, and output a memset command when the read command is the unmapped read command; and
a page buffer configured to generate unmapped data by performing a memset operation in response to the memset command,
wherein the memset operation does not include a read operation for a memory cell array, and
the page buffer includes a status register configured to indicate a status of the page buffer.

2. The memory device of claim 1, wherein
the read command includes information about a target address to be read, and the unmapped read control module comprises:
an unmapped read decision unit configured to analyze the target address to decide whether the read command is the unmapped read command; and
an unmapped data decision unit configured to decide the unmapped data requested by the target address when the read command is the unmapped read command.

3. The memory device of claim 1, wherein
the page buffer is configured to generate the unmapped data by receiving a seed with the memset command and utilizing the seed in the memset operation.

4. The memory device of claim 1, wherein
the page buffer is configured to generate the unmapped data by receiving a seed and a pattern with the memset command and utilizing the seed and the pattern in the memset operation.

5. The memory device of claim 4, wherein
a data size of the unmapped data is the same as a capacity of the page buffer.

6. The memory device of claim 5, wherein
the pattern includes a copy operation, and
the unmapped data is data in which the seed is copied up to the capacity of the page buffer.

7. The memory device of claim 4, wherein the memory device further includes a direct memory access (DMA), and
the DMA is configured to receive the unmapped data from the page buffer and output the unmapped data to the host.

8. The memory device of claim 1, wherein
the unmapped read control module is configured to confirm availability of the status register if the read command is the unmapped read command, and output the memset command to the page buffer only when the status register is not busy.

9. The memory device of claim 1, wherein
the unmapped read control module is configured to output a normal read command to the page buffer when the read command is not the unmapped read command.

10. A memory system comprising:
a nonvolatile memory device including an unmapped read control module configured to receive a read command from a host, determine whether the read command is an unmapped read command, and output a memset command when the read command is the unmapped read command, and a page buffer configured to perform a memset operation corresponding to the memset command to generate unmapped data; and
a volatile memory device communicably connected to the nonvolatile memory device and the host,
wherein the memset operation does not include a read operation for a nonvolatile memory cell array of the nonvolatile memory device,
the page buffer includes a status register configured to indicate a status of the page buffer, and
the unmapped read control module is configured to confirm availability of the status register if the read command is the unmapped read command, and output the memset command to the page buffer only when the status register is not busy.

11. The memory system of claim 10, wherein
the read command includes information about a target address to be read, and
the unmapped read control module comprises:
an unmapped read decision unit configured to analyze the target address to decide whether the read command is the unmapped read command; and
an unmapped data decision unit configured to decide the unmapped data requested by the target address when the read command is the unmapped read command.

12. The memory system of claim 10, wherein
the page buffer is configured to generate the unmapped data by receiving and utilizing a seed and a pattern in the memset operation.

13. The memory system of claim 12, wherein the nonvolatile memory device further includes a direct memory access (DMA), and
the DMA is configured to receive the unmapped data from the page buffer and output the unmapped data to the volatile memory device.

14. The memory system of claim 13, wherein
the volatile memory device is configured to output the received unmapped data to the host.

15. A method of operating a nonvolatile memory device comprising a memory cell array, the method comprising:
receiving a read command from a host;
determining whether the read command is an unmapped read command;
outputting a status check signal to a status register;
receiving one of a busy signal or an available signal from the status register;
performing an unmapped read operation to generate unmapped data when it is determined that the read command is the unmapped read command and the available signal is received; and
outputting the unmapped data to the host,
wherein the unmapped read operation does not include a read operation for the memory cell array.

16. The method of claim 15, wherein determining whether the read command is an unmapped read command comprises:

determining whether data is written in a target address using a mapping table, wherein the target address and the mapping table are included in the read command;

determining that the read command is the unmapped read command when data is not written in the target address; and determining that the read command is not the unmapped read command when data is written in the target address.

17. The method of claim 15, wherein performing the unmapped read operation comprises:

receiving a target address included in the read command;

determining unmapped data requested by the host using the target address;

generating a seed and a pattern using the determined unmapped data and an unmapped data table, wherein the seed is a unit of data and the pattern is an algorithm to be performed using the seed;

outputting the seed and the pattern to a page buffer; and generating the unmapped data using the seed and the pattern.

18. The method of claim 15, further comprising:

waiting for a predetermined amount of time when the busy signal is received; and outputting the status check signal to the status register after waiting for the predetermined amount of time to receive one of the busy signal or the available signal from the status register.

* * * * *